United States Patent
Li et al.

(10) Patent No.: US 11,017,811 B1
(45) Date of Patent: May 25, 2021

(54) PLAYBACK SPEED OPTIMIZATION

(71) Applicant: Lenovo (Singapore) Pte. Ltd., Singapore (SG)

(72) Inventors: Scott W. Li, Cary, NC (US); Robert J. Kapinos, Durham, NC (US); Russell Speight VanBlon, Raleigh, NC (US); Robert Norton, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/738,892

(22) Filed: Jan. 9, 2020

(51) Int. Cl.
*G11B 27/28* (2006.01)
*G11B 27/00* (2006.01)
*H04N 5/783* (2006.01)
*G11B 27/10* (2006.01)

(52) U.S. Cl.
CPC .......... *G11B 27/005* (2013.01); *G11B 27/105* (2013.01); *G11B 27/28* (2013.01); *H04N 5/783* (2013.01)

(58) Field of Classification Search
None
See application file for complete search history.

(56) References Cited

U.S. PATENT DOCUMENTS

| | | | | |
|---|---|---|---|---|
| 2013/0071089 | A1* | 3/2013 | Fujimoto | G06F 16/7847 386/241 |
| 2015/0331941 | A1* | 11/2015 | Defouw | H04N 21/25891 707/687 |
| 2017/0064244 | A1* | 3/2017 | Abou Mahmoud | H04N 5/7605 |

* cited by examiner

*Primary Examiner* — Eileen M Adams
(74) *Attorney, Agent, or Firm* — VanLeeuwen & VanLeeuwen; Jason A. Friday

(57) ABSTRACT

An approach is provided that identifies a preferred words-per-minute corresponding to a user listening to an audio. The actual words-per-minute of a selected audio segment is determined and used to calculate a playback speed adjustment value based on the preferred words-per-minute and the actual words-per-minute. A playback speed is adjusted according to the calculated playback speed adjustment value and the audio segment is audibly played at the adjusted first playback speed.

17 Claims, 6 Drawing Sheets

Information Handling System Processor and Components

PLAYBACK SPEED OPTIMIZATION

BACKGROUND

Many podcasts and audio streaming apps have added adjustable playback speed functions. This is due to the fact that people can often listen at a higher rate than they can talk. A challenge with adjustable playback is that speech rate varies greatly from person to person or even from the same person under different situations. For example, a person may prefer to listen to a podcast at 250 words per minute and, for a slow speech rate of 80 words per minute, the playback speed is over four times faster. However, with a faster speaking individual, such as an audio stream from someone speaking at 220 words per minute, the playback speed is only slightly higher (approx. 1.1 times higher). Traditional playback systems with adjustable speed controls do not dynamically adjust based on the rate of speech in the media being played. Additionally, many recordings are played back when the listener is busy with another activity, such as driving an automobile, in which cases manually adjusting the playback speed is not only impractical, but can also be dangerous.

SUMMARY

An approach is provided that identifies a preferred words-per-minute corresponding to a user listening to an audio. The actual words-per-minute of a selected audio segment is determined and used to calculate a playback speed adjustment value based on the preferred words-per-minute and the actual words-per-minute. A playback speed is adjusted according to the calculated playback speed adjustment value and the audio segment is audibly played at the adjusted first playback speed.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The figures show an approach that identifies a user's preferred playback speed when listening to an audio file. The identification of the playback speed can be learned from the user or provided as a fixed value from the user. The speed can be based on the type of audio file being played. For example, a more complex technical audio file can be set to have a lower playback speed than an entertainment type of audio file, such as a sports podcast, etc. The type of audio file being played can be determined by the source of the audio file (e.g., played from a sports website, a technical website, etc.) as well as based on an analysis of the words in the audio file. For example, an audio file with complex technical terms might be identified as a "technical" file, whereas an audio file with numerous sports terms and references might be identified as a "sports" or "entertainment" type of audio file. The audio file is broken down into segments so that adjustments can be made to speed up or slow down the playback speed based on the actual words-per-minute being spoken during each of the segments.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
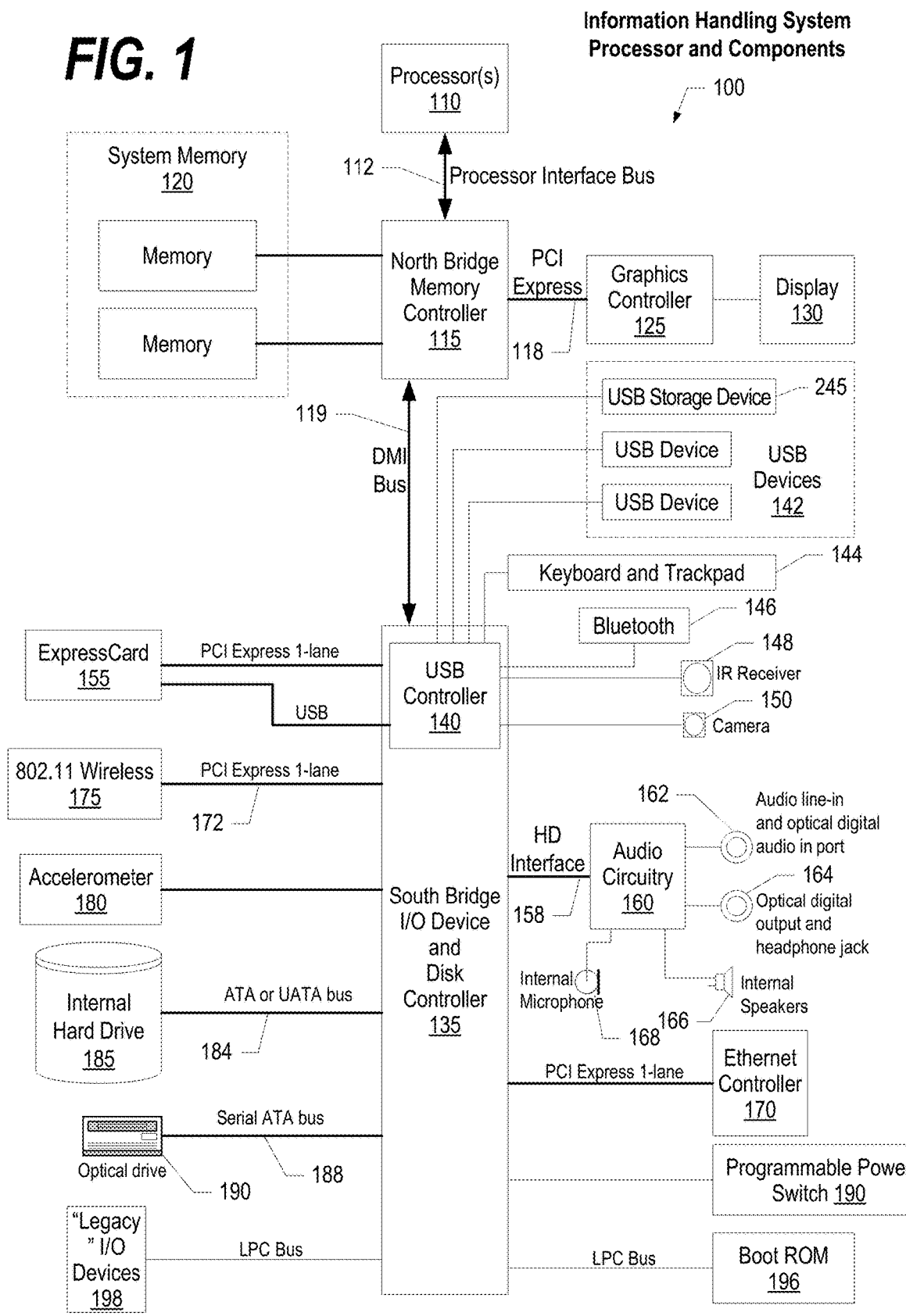
FIG. 1 is a block diagram of a data processing system in which the methods described herein can be implemented.
Figure 2:
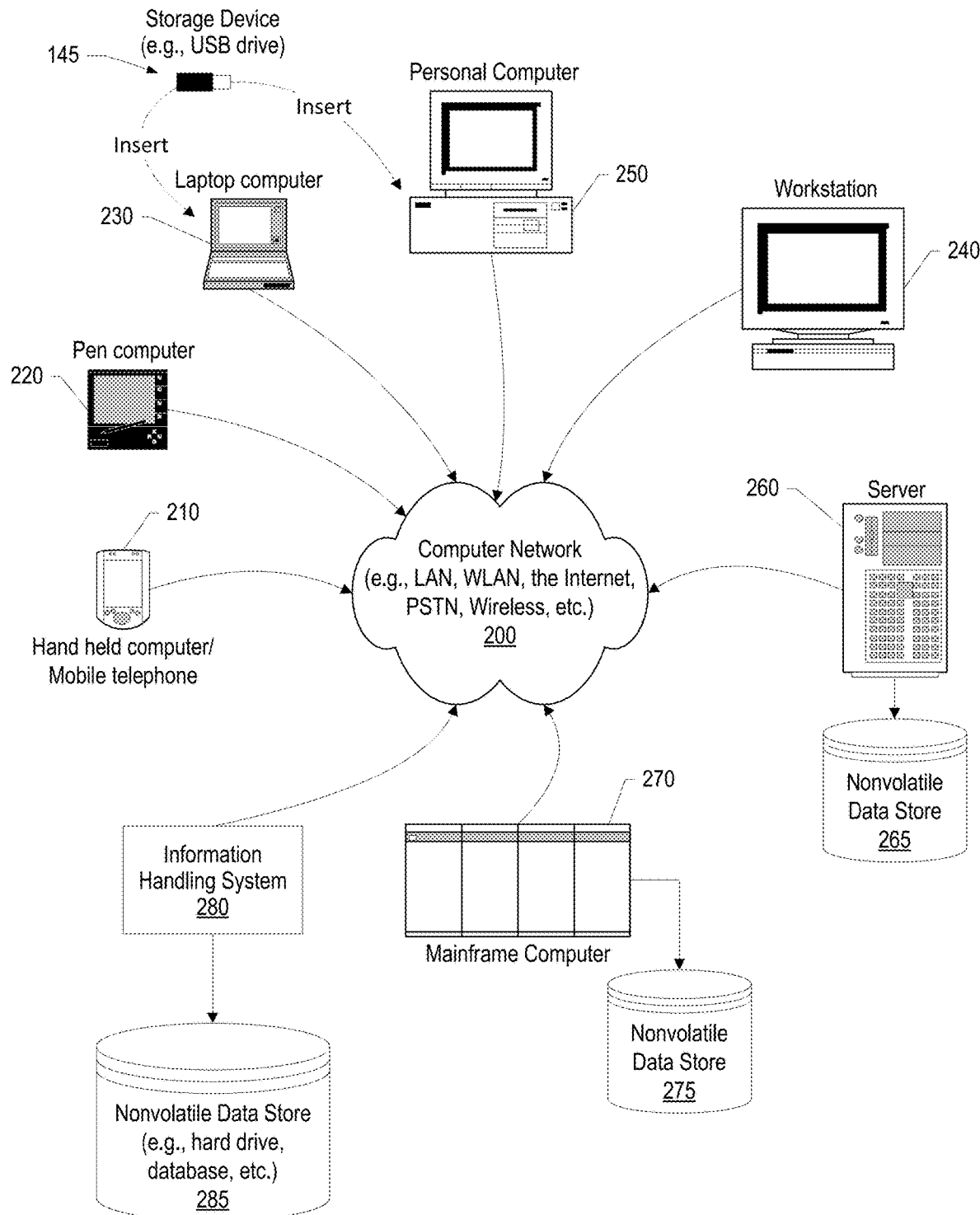
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
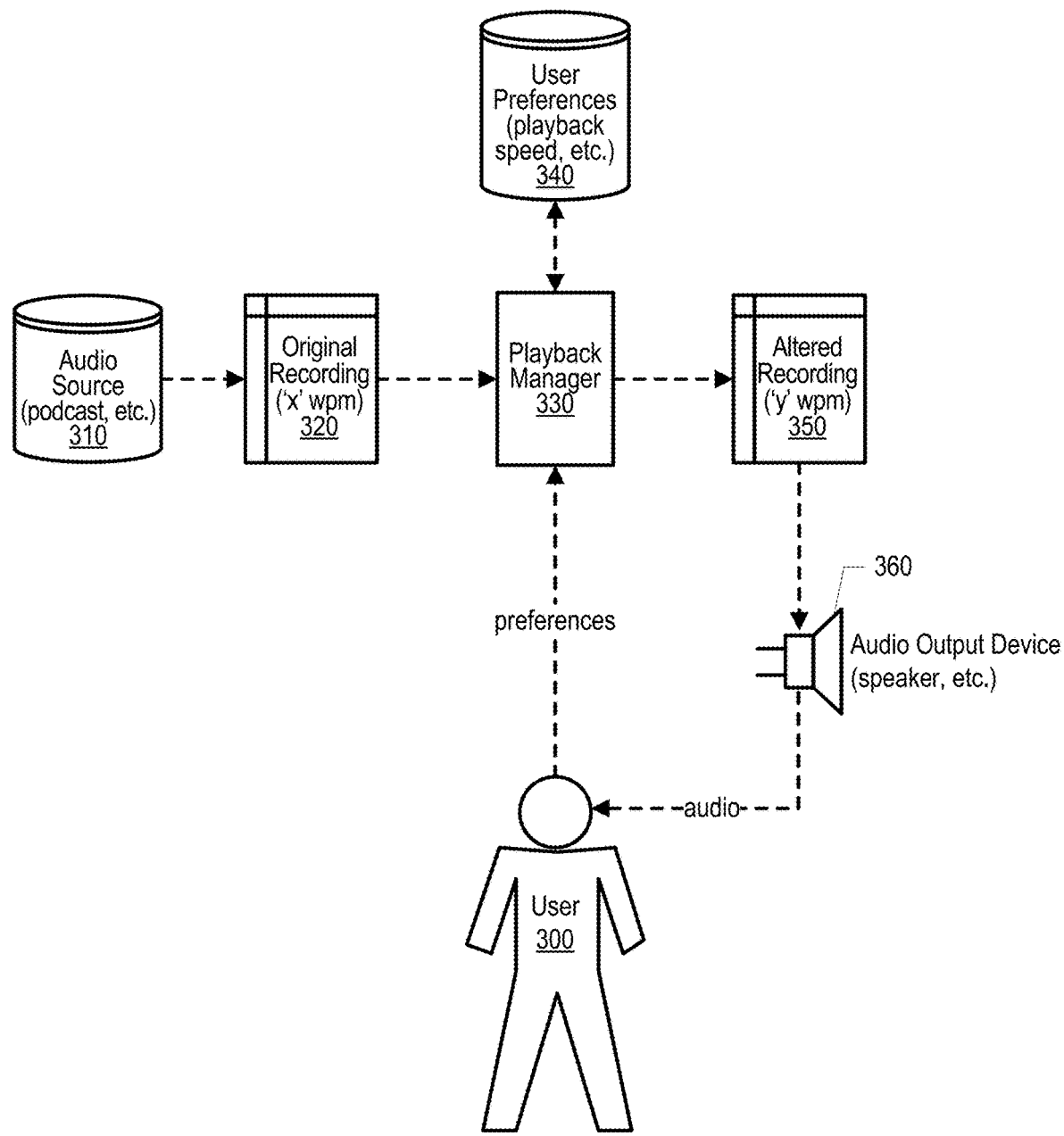
FIG. 3 is a component diagram depicting the components used in a playback speed optimization system.

FIG. 3 is a component diagram depicting the components used in a playback speed optimization system. User 300 has a preferred words-per-minute (WPM) that he or she likes when listening to an audio source file 310, such as a podcast or other recording. The user's preferred WPM may depend on the type of audio source file that is being played. For example, the user may have a preferred WPM for listening to complex material, such as technical documents, that is lower than the preferred WPM when listening to sports or other types of entertainment audio source files. The type of audio source file 310 can be determined based on the source of the file, such as if the audio source file is from a sports website or from a computer company or other technical organization.

The process determines the actual words-per-minute of the audio source file which is the actual number of words-per-minute that were spoken or otherwise provided when audio source file 310 was created. The process determines the actual WPM and stores this value in memory area 320. Playback manager 330 retrieves the user's preferred WPM from a user preferences data store 340 and the preferred WPM may be based on the type of audio source file that is being played. Playback manager process 330 separates audio source file 310 into segments with each of the segments having a playback speed that is calculated based on the user's preferred WPM divided by the actual WPM in the segment. The altered recording at the adjusted playback speed is stored in memory area 350 where it is then transmitted to audio output device 360, such as speakers or headphones, where it is audibly transmitted to user 300 at the user's preferred playback speed.

Figure 4:
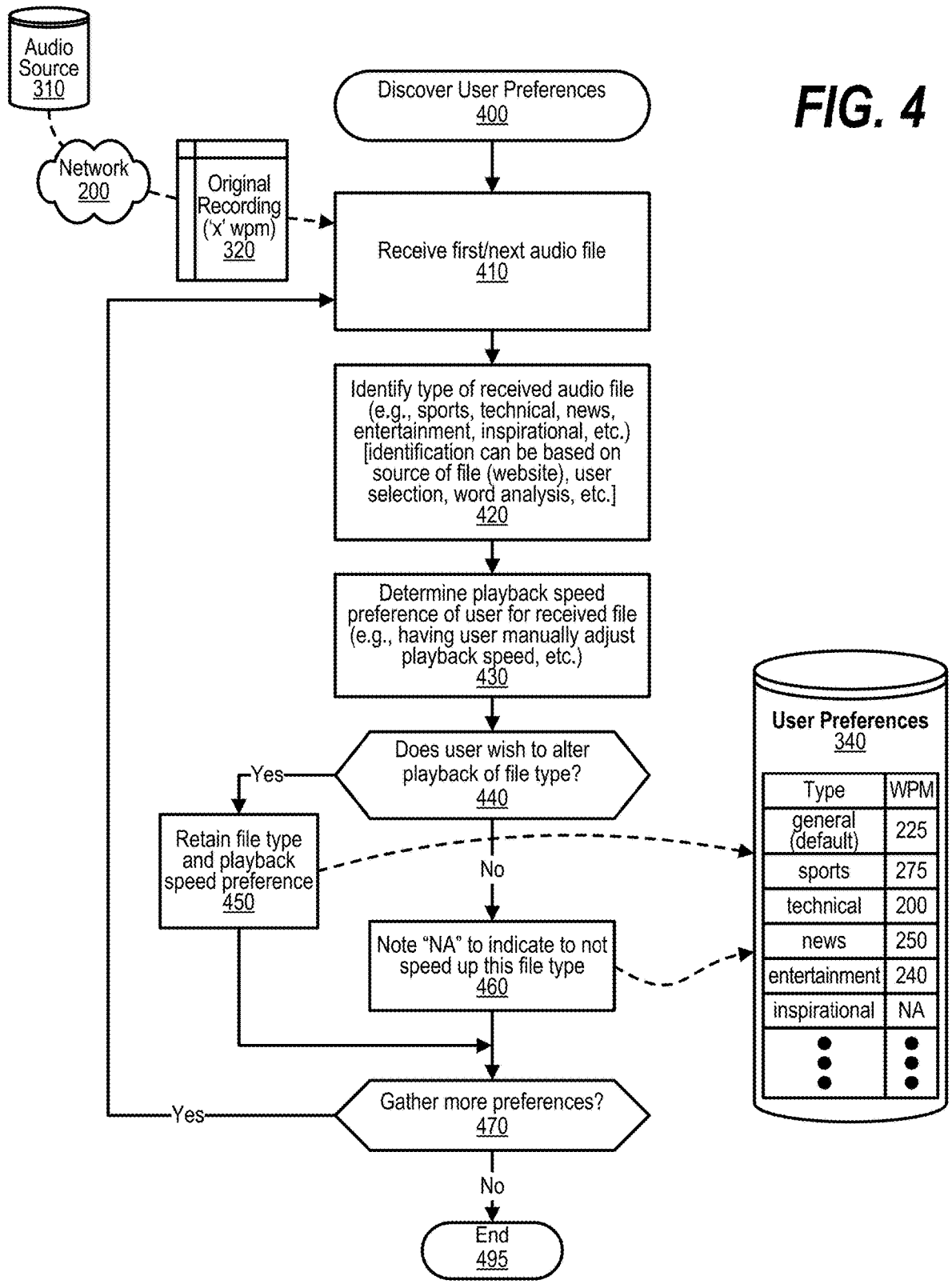
FIG. 4 is a flowchart showing steps taken by a process that discovers the user's preferences relating to the playback speed that is preferred by a particular user.

FIG. 4 is a flowchart showing steps taken by a process that discovers the user's preferences relating to the playback speed that is preferred by a particular user. FIG. 4 processing commences at 400 and shows the steps taken by a process that discovers a user's playback speed preferences. At step 410, the process receives the first audio file from data store 310. The audio file might be sent through computer network 200, such as the Internet, where it is stored in memory area 320 at the original, or actual, words-per-minute (WPM) that was spoken during the recording of the audio source.

At step 420, the process identifies the type of the received audio file. For example, the type might be sports, technical, news, entertainment, inspirational, or the like. Identification of the type of audio source can be based on the source location of the audio source file (e.g., a sports website, etc.), provided by a user selection, based on a word analysis of the words included in the audio source file (e.g., sports terms, technical terms, financial terms, etc.). At step 430, the process determines the playback user's preferred speed for listening to the received type of audio file. This can be performed by having the user manually adjust the playback speed to a comfortable level for this user.

The process determines as to whether the user wishes to alter the playback speed of this type of audio file (decision 440). If the user wishes to alter the playback speed of this type of audio file, then decision 440 branches to the 'yes' branch whereupon at step 450, the process retains the type of audio source file and the user's playback speed preference in data store 340. On the other hand, if the user does not wish to alter the playback speed of this type of audio file, such as an inspirational audio file where cadence and delivery might be more important, then decision 440 branches to the 'no' branch whereupon, at step 460, the process notes "NA" for this type of audio file in data store 340 to indicate that this type of audio file should not have its original speed adjusted.

The process determines as to whether the discovery process is gathering more user preferences by processing additional audio source files (decision 470). If the discovery process is gathering more user preferences, then decision 470 branches to the 'yes' branch which loops back to step 310 to receive and process the next audio source file as described above. This looping continues until the discovery process is no longer gathering more user preferences, at which point decision 470 branches to the 'no' branch exiting the loop and the discovery process ends at 495.

Figure 5:
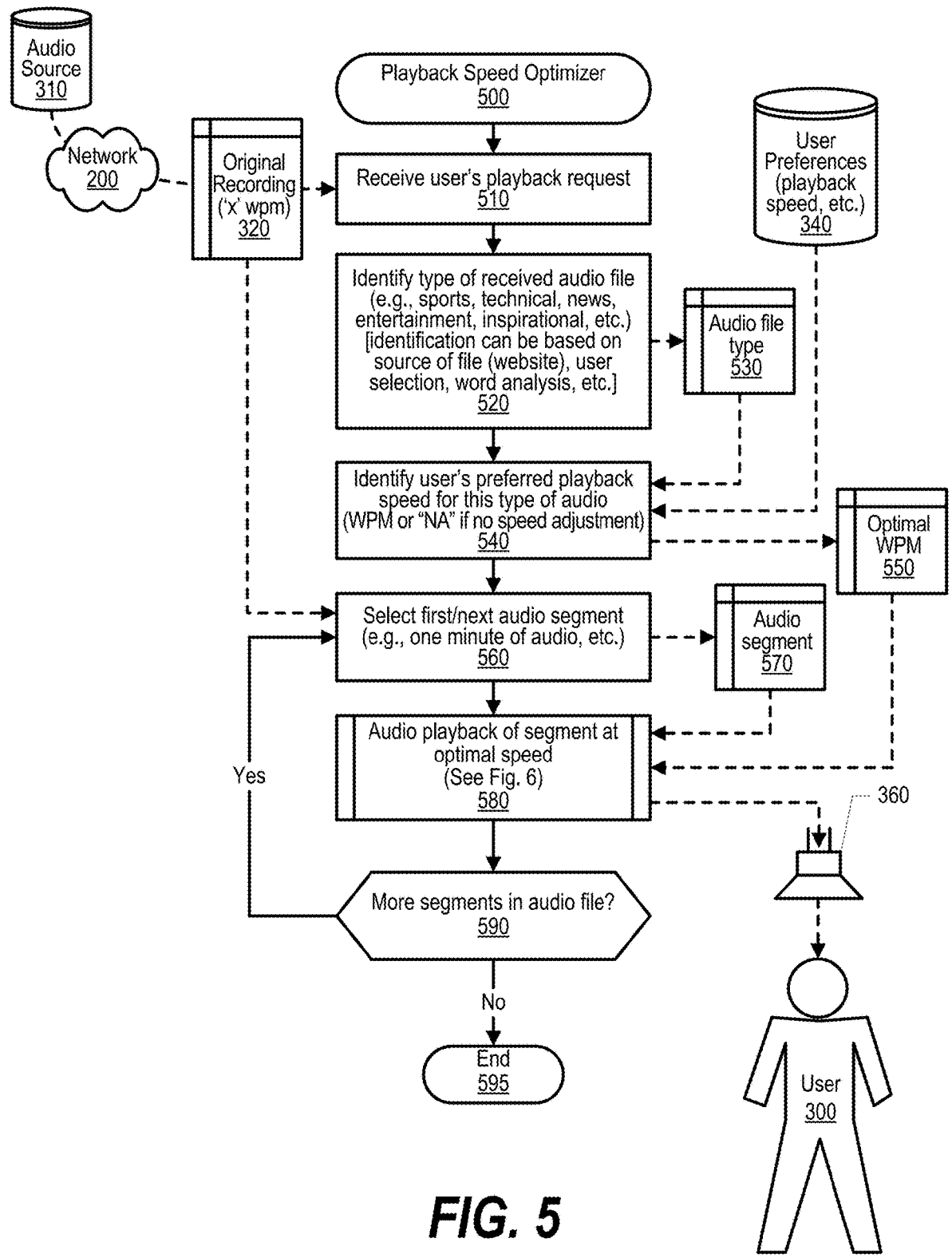
FIG. 5 is a flowchart showing steps taken by a playback speed optimizer process.

FIG. 5 is a flowchart showing steps taken by a playback speed optimizer process. FIG. 5 processing commences at 500 and shows the steps taken by a playback speed optimizer process that adjusts audio playback speeds according to user preferences as shown being gathered in FIG. 4. At step 510, the process receives the user's playback request. As shown, audio source file 310 may be a network accessible file accessed via computer network 200, such as the Internet, and received in memory area 320. A network streaming process might provide successive audio segments from the audio source file with each audio segment being stored in a memory area. The original recording is received with the speed at the actual words-per-minute (WPM) that we spoken or otherwise produced when the audio source file was created.

At step 520, the process identifies the type of the received audio file, such as sports, technical, news, entertainment, inspirational, and the like. Identification of the type of audio source file can be based on the source location of the audio source file, such as a sports website, a financial news website, or the like. The type of audio source can also be provided by a user selection as well as by a word analysis of the words found in the audio source file, such as sports terms, financial terms, technical terms, or the like. The type of audio file that is being received is stored in memory area 530.

At step 540, the process identifies the user's preferred playback speed for this type of audio file. In one embodiment, the playback speed is either in the number of words-per-minute (WPM) if the user wishes to have the playback speed adjusted, or the speed is noted as "NA" if the user has indicated that no speed adjustment should be made with this type of audio source file. The user's preferred playback speed for this type of audio source file is retrieved from user preferences data store 340 and the selected playback speed for this particular type of source file is stored in memory area 550 as the user's preferred words-per-minute for this type of audio source file. At step 560, the process selects the first audio segment from the incoming audio recording received at memory area 320. For example, a segment might be one minute of audio recording, etc.

Figure 6:
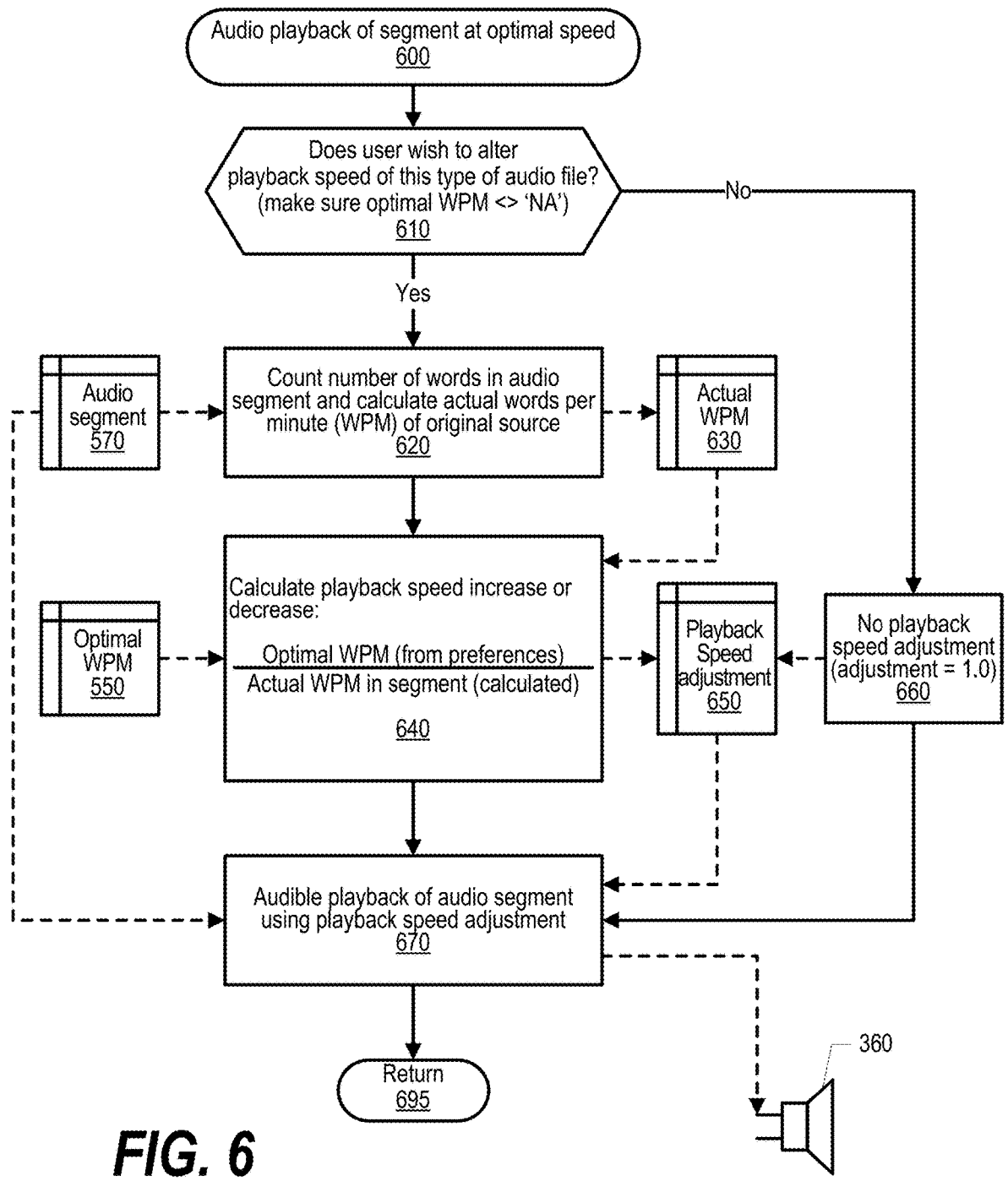
FIG. 6 is a flowchart showing steps taken by a process that plays an audio segment at the user's determined optimal playback speed.

At predefined process 580, the process performs the Audio Payback of Audio Segment at Preferred Speed routine (see FIG. 6 and corresponding text for processing details). This routine outputs (plays) the selected audio segment at the adjusted playback speed according to the user's preferences. This output is transmitted through audio output device 360, such as speakers or headphones, and delivered to user 300.

The process determines as to whether there are more audio segments in the audio source file to select and process (decision 590). If there are more audio segments in the audio source file, then decision 590 branches to the 'yes' branch which loops back to step 560 to select and process the next segment from the audio source file as described above. This looping continues until there are not more segments left in the audio source file to play (the recording has finished playing), at which point decision 590 branches to the 'no' branch exiting the loop and processing ends at 595.

FIG. 6 is a flowchart showing steps taken by a process that plays an audio segment at the user's determined optimal playback speed. FIG. 6 processing commences at 600 and shows the steps taken by a process that performs the audio playback of an audio segment at the user's preferred speed in words-per-minute (WPM).

The process determines as to whether the user has indicated a preference to adjust the playback speed for this type of audio source file (decision 610). If the user has indicated a preference to adjust the playback speed for this type of audio source file, then decision 610 branches to the 'yes' branch to perform steps 620 through 640 that adjust the playback speed of the audio segment.

On the other hand, if the user has indicated a preference to not adjust the playback speed for this type of audio source file, perhaps an inspirational audio file, then decision 610 branches to the 'no' branch bypassing steps 620 and 640 and, instead, at step 660 no playback speed adjustment is made by storing a value of one (1) in memory area 650 to use as the speed adjustment.

If a playback speed adjustment is being made for this audio segment, then steps 620 and 640 are performed. At step 620, the process counts the actual number of words in audio segment and calculates the actual words per minute (WPM) of the original source from audio segment 570 with the actual WPM being stored as a value in memory area 630. At step 640, the process calculates the playback speed increase or decrease by dividing the preferred words-perminute for this user for this type of audio file by the actual words-per-minute used to record this audio segment. The result of this division operation are stored in memory area 650 as the playback speed adjustment value to use for the audio segment stored in memory area 570.

At step 670, the process plays the audio segment from memory area 570 using the playback speed adjustment value stored in memory area 650 to speed up or slow down the actual recording. This play back results in the adjusted audio being output through audio output device 360, such as speakers or headphones. FIG. 6 processing thereafter returns to the calling routine (see FIG. 5) at 695.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, and a network interface connecting the information handling system to a computer network, the method comprising:
   identifying a preferred words-per-minute corresponding to a user, wherein the identifying further comprises:
      determining a type of the audio source file; and
      selecting the preferred words-per-minute based on the determined type of the audio source file;
   determining a first actual words-per-minute as originally spoken and recorded in a selected first audio segment;
   calculating a first playback speed adjustment value based on the preferred words-per-minute and the first actual words-per-minute;
   adjusting a first playback speed according to the calculated first playback speed adjustment value; and
   audibly playing the first audio segment at the adjusted first playback speed.

2. The method of claim 1 further comprising:
   partitioning the audio source file into a plurality of audio segments that includes the selected audio segment.

3. The method of claim 2 further comprising:
   determining a second actual words-per-minute of a second audio segment selected from the plurality of audio segments;
   calculating a second playback speed adjustment value based on the preferred words-per-minute and the second actual words-per-minute;
   adjusting a second playback speed according to the calculated second playback speed adjustment value, wherein the second playback speed is different than the first playback speed; and
   audibly playing the second audio segment at the adjusted second playback speed.

4. The method of claim 1 further comprising:
   identifying the type of the audio source file based on a source corresponding to the audio source file.

5. The method of claim 1 further comprising:
   identifying the type of the audio source file based on a word analysis performed on the audio source file.

6. The method of claim 1 further comprising:
   calculating the playback speed adjustment by dividing the preferred words-per-minute by the actual words-per-minute.

7. An information handling system comprising: one or more processors; an audio output accessible by at least one of the processors; a memory coupled to at least one of the processors; and a set of computer program instructions stored in the memory and executed by at least one of the processors in order to perform actions comprising: identifying a preferred words-per-minute corresponding to a user, wherein the identifying further comprises:
   determining a type of the audio source file; and selecting the preferred words-per-minute based on the determined type of the audio source file; determining a first actual words-per-minute as originally spoken and recorded in a selected first audio segment;
   calculating a first playback speed adjustment value based on the preferred words-per-minute and the first actual words-per-minute; adjusting a first playback speed according to the calculated first playback speed adjustment value; and audibly playing, via the audio output, the first audio segment at the adjusted first playback speed.

8. The information handling system of claim 7 wherein the actions further comprise:
   partitioning the audio source file into a plurality of audio segments that includes the selected audio segment.

9. The information handling system of claim 8 wherein the actions further comprise:
   determining a second actual words-per-minute of a second audio segment selected from the plurality of audio segments;
   calculating a second playback speed adjustment value based on the preferred words-per-minute and the second actual words-per-minute;
   adjusting a second playback speed according to the calculated second playback speed adjustment value, wherein the second playback speed is different than the first playback speed; and
   audibly playing the second audio segment at the adjusted second playback speed.

10. The information handling system of claim 7 wherein the actions further comprise:
    identifying the type of the audio segment based on a source corresponding to the audio source file.

11. The information handling system of claim 7 wherein the actions further comprise:
    identifying the type of the audio source file based on a word analysis performed on the audio source file.

12. The information handling system of claim 7 wherein the actions further comprise:
    calculating the playback speed adjustment by dividing the preferred words-per-minute by the actual words-per-minute.

13. A computer program product comprising: a computer readable storage medium, comprising computer program code that, when executed by an information handling system, executes actions comprising: identifying a preferred words-per-minute corresponding to a user, wherein the identifying further comprises:
    determining a type of the audio source file; and selecting the preferred words-per-minute based on the determined type of the audio source file; determining a first actual words-per-minute as originally spoken and recorded in a selected first audio segment;
    calculating a first playback speed adjustment value based on the preferred words-per-minute and the first actual words-per-minute; adjusting a first playback speed according to the calculated first playback speed adjustment value; and audibly playing the first audio segment at the adjusted first playback speed.

14. The computer program product of claim 13 wherein the actions further comprise:
    partitioning the audio source file into a plurality of audio segments that includes the selected audio segment.

15. The computer program product of claim 14 wherein the actions further comprise:
    determining a second actual words-per-minute of a second audio segment selected from the plurality of audio segments;

calculating a second playback speed adjustment value based on the preferred words-per-minute and the second actual words-per-minute;

adjusting a second playback speed according to the calculated second playback speed adjustment value, wherein the second playback speed is different than the first playback speed; and audibly playing the second audio segment at the adjusted second playback speed.

16. The computer program product of claim 13 wherein the actions further comprise:

identifying the type of the audio source file based on a source corresponding to the audio source file.

17. The computer program product of claim 13 wherein the actions further comprise:

identifying the type of the audio source file based on a word analysis performed on the audio source file.

\* \* \* \* \*